United States Patent [19]
Oliva et al.

[11] 4,335,616
[45] Jun. 22, 1982

[54] PROCESS AND DEVICE FOR MEASURING THE FLOW RATE OF A FLUID

[76] Inventors: Ambro Oliva, Deuil la Barre; Luc Joly, Soisy sur Montmorency, both of France

[21] Appl. No.: 171,794

[22] Filed: Jul. 24, 1980

[30] Foreign Application Priority Data

Jul. 26, 1979 [FR] France .................................. 79 19337

[51] Int. Cl.³ ............................ G01F 1/68; G01F 1/70
[52] U.S. Cl. .................................................. 73/861.05
[58] Field of Search ............................. 73/861.05, 204

[56] References Cited

U.S. PATENT DOCUMENTS

| | | | |
|---|---|---|---|
| 2,724,271 | 11/1955 | Shawhan | 73/204 |
| 2,799,165 | 7/1957 | Varvel | 73/204 |
| 3,019,647 | 2/1962 | Beard et al. | 73/861.05 |
| 3,922,912 | 2/1975 | Bradbury | 73/204 |
| 4,173,888 | 11/1979 | Suzuki | 73/861.05 |
| 4,237,730 | 9/1980 | Feng | 73/204 |

*Primary Examiner*—Herbert Goldstein
*Attorney, Agent, or Firm*—Spencer & Kaye

[57] ABSTRACT

A device for measuring the velocity of flow of a fluid comprises a length of pipeline through which the fluid flows. A first resistance is mounted to extend across the pipeline at a first point and is supplied with periodic input pulses by a pulse generator such that the temperature of the first resistance is caused to rise periodically. A second resistance is mounted to extend across the pipeline at a second point which is spaced downstream of the first point. The second resistance has a value which varies with temperature and produces an output signal when it detects fluid heated by the first resistance. A circuit measures the time between an input pulse and the corresponding output signal such that the velocity of the flow of the fluid can be determined.

3 Claims, 2 Drawing Figures

PROCESS AND DEVICE FOR MEASURING THE FLOW RATE OF A FLUID

The present invention relates to a process for measuring the velocity of flow of a fluid by determining the transit time of a marker over a reference distance, and to a flowmeter using the process.

BACKGROUND TO THE INVENTION

The measurement of the flow velocity of fluids in pipelines, and the corresponding measurement of the delivery rate, is usually based on the laws of the mechanics of fluids which govern the reactions between a moving fluid and a measuring device (such as a Venturi, vane wheel or the like). Sometimes, marker elements are used, which travel with the fluid, such as floats on a stream of water, and the transit time of this element over a reference distance is determined. These measurements, which are simple in principle, in general only give approximate results.

The velocity of flow of fluids has been measured by determining the velocity of particles by the Doppler effect of a coherent light beam reflected from these particles. These measurements are precise but employ expensive apparatus and, in particular, precision optical devices.

The present invention relates to a process for measuring the flow velocity of a fluid which employs marking elements and which gives a precision comparable to that of the usual measurements which make use of the mechanics of fluids, whilst remaining simple and inexpensive.

The invention also relates to such a process of measurement, where the marking element is produced from the fluid itself.

SUMMARY OF THE INVENTION

According to the present invention there is provided a process for measuring the velocity of flow of a fluid comprising the steps of causing periodically a brief disturbance to the physical state of the fluid at a first flow point, and detecting this disturbance at a second point downstream of the first flow point, the first and second flow points being spaced by a predetermined distance in the direction of flow of the fluid, and determining the time between the moments at which the disturbance is caused and the disturbance is detected.

Since the fluid is flowing, so that diffusion is slight, the disturbance in the physical state remains localised in the fluid for a relatively long period and follows the movement of the fluid before it disappears, so that measuring the velocity over a suitable reference distance allows good precision to be achieved, and the fluid remains similar to its previous condition after the disturbance has disappeared.

Preferably, the disturbance is a temperature rise, which is easy to create and to detect, with small temperature differences which do not significantly affect the flow.

Preferably, the fluid is a gas which has a low thermal inertia and is a poor conductor.

In an embodiment, a disturbance in the physical state of the fluid is caused at a first point of the flow and the time which separates the instants at which the disturbance is detected at two points downstream of the first point and separated from one another by a reference distance in the direction of flow is measured. The two instants at the respective ends of the measuring interval are detected by phenomena of the same nature, and the creation of the periodic disturbance can be automatic.

The invention also extends to a flowmeter for a fluid, comprising a length of pipeline through which the fluid flows, emitting means for producing in response to an input pulse, a disturbance to the state of the fluid positioned in the pipeline at a first point in its length, a detector sensitive to the disturbance in the state of the fluid for emitting an output signal, the detector being positioned in the pipeline at a second point in its length spaced downstream of said first point in the direction of flow by a predetermined distance, a pulse generator for periodically applying an input pulse to said emitting means, and means connected to said pulse generator and to said detector for measuring the time between an input pulses and the corresponding output signal.

It is clear that in a pipeline through which the fluid flows, there is a direct relation between the velocity and the delivery rate. The repetition of the determinations in step with the pulse generator provides a substantially constant measurement of the delivery rate.

Preferably, the emitting means is an electrical resistance in the form of a grid, in a cross-sectional plane of the length of pipeline, and the detector is an electrical resistance having a substantial temperature coefficient.

BRIEF DESCRIPTION OF THE DRAWINGS

An embodiment of the present invention will hereinafter be described, by way of example, with reference to the accompanying drawings, in which.

DESCRIPTION OF PREFERRED EMBODIMENT

Figure 1:
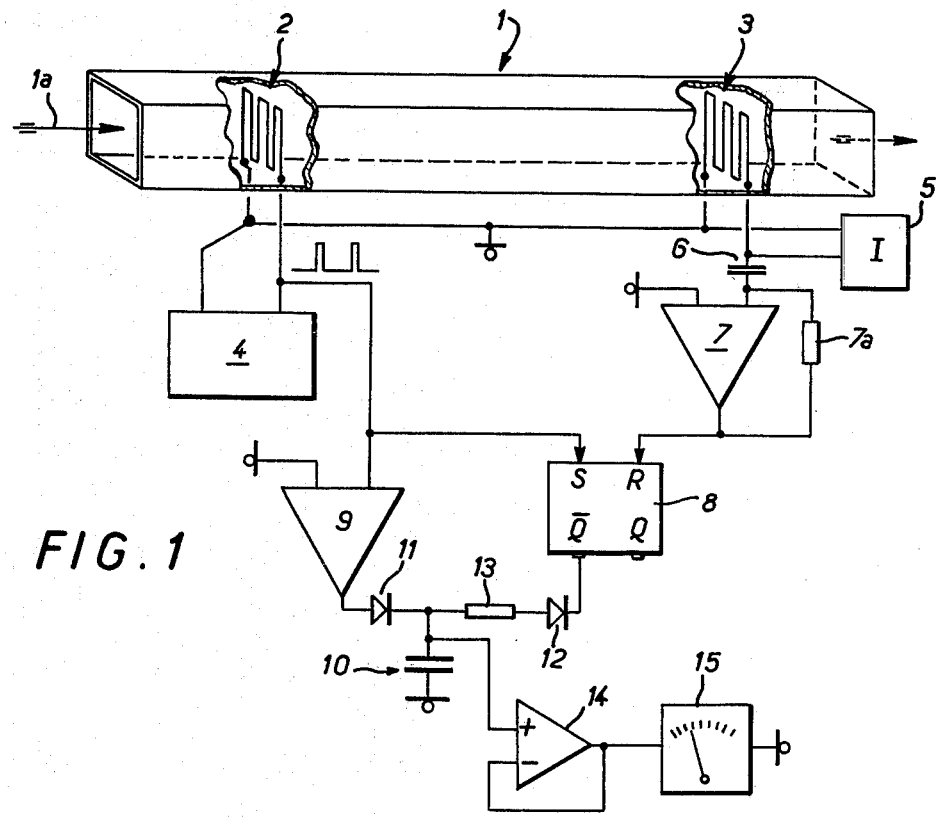
FIG. 1 shows diagrammatically a flowmeter according to the invention.

The flowmeter shown in FIG. 1 has a length of pipeline 1 through which a stream of fluid flows in the direction of the arrow 1a. In this pipeline is located a resistance 2 which consists of a fine wire folded to form a grid located in a transverse plane of the length of pipeline 1. A resistance 3, also formed of a fine wire folded into the shape of a grid, and having a temperature coefficient, that is to say having an electrical resistance which varies markedly with temperature, is located at a reference distance downstream of the resistance 2.

A pulse generator 4 delivers to the resistance 2 pulses of energy sufficient to raise the temperature of this resistance significantly. The time between successive pulses is large compared to the thermal inertia of the resistance, and is greater than the time of travel of the fluid between the resistances 2 and 3 at the minimum measurable delivery rate of the fluid.

The resistance 3 is fed with a constant current by a source 5 of direct current. The current which flows through the resistance 3 is sufficiently low that the resulting rise in temperature is also low, so that the temperature of the resistance 3 and correspondingly the potential set up at its terminals essentially depend on the temperature of the fluid in the length of pipeline 1. The potential set up at the terminals of the resistance 3 is applied to the input of an amplifier 7 across a differentiating capacitor 6, a feedback resistance 7a being located between the output and input of the amplifier 7 to regulate its gain.

A flip-flop 8 is enabled by the pulses coming from the generator 4 and is disabled by the output of the amplifier 7. The output of the generator 4 is also connected to the input of an amplifier 9 which is not provided with feedback such that it is either conducting or not. A capacitor 10 is connected so that it is charged, via a diode 11, by the saturation output potential of the amplifier 9, and is gradually discharged via a resistance 13 and a diode 12 by the negative output of the flip-flop 8, which is at zero potential relative to earth when the flip-flop is enabled. A buffer amplifier 14, having virtually infinite input impedance, transmits the charge potential of the capacitor 10 to a potentiometric device 15.

The process of operation may be described as follows: each pulse delivered by the generator 4 causes an abrupt rise in the temperature of the resistance 2 over the duration of the pulse. After the end of the pulse, the resistance 2 cools, and releases its heat energy to the stream of fluid. This stream of fluid undergoes a thermal disturbance, which comprises a steep leading flank, corresponding to the rise in temperature of the resistance 2, followed by a trailing flank which decreases with the temperature of this resistance 2. When the disturbance reaches the resistance 3, after a time equal to the quotient of the reference distance divided by the velocity of the fluid, this resistance 3 undergoes a variation in the value of the resistance which is representative of the variation in temperature of the fluid in the disturbances, so that the potential at the terminals reflects the variation in resistance. It will be noted that the diffusion of heat into the zones of fluid which are contiguous to the disturbance only has an effect in the direction of flow, and slightly reduces the steepness of the leading flanks of the disturbance.

The variations in potential at the terminals of the resistance 3 are differentiated by the capacitor 6 before being applied to the amplifier 7 so that the steep leading flank of the disturbance is applied to the amplifier 7 as a pulse of relatively large amplitude whilst the trailing flank, which decreases gradually, is applied to the amplifier as a pulse in the opposite direction and of lesser amplitude.

The pulse which has come from the generator 4 has simultaneously enabled the flip-flop 8 and charged the capacitor 10 via the diode 11 by means of the amplifier 9. At the end of this pulse, the capacitor 10 discharges to the negative output of the flip-flop 8, via the resistance 13 and the diode 12, whilst the diode 11 prevents discharge to the output of the amplifier 9. When the amplifier 7 emits the pulse corresponding to the detection, by the resistance 3, of the leading flank of the disturbance, the flip-flop 8 is disabled and its negative output changes to a high potential, so that the capacitor 10 ceases to discharge. Since the amplifier 14 has an infinite input impedance, it transmits the potential at the terminals of the capacitor 10 to the potentiometric device 15 without affecting the charging or discharging of the capacitor 10.

Of course the potentiometric device 15 reacts both to the applied mean potential and to the potential at the end of the discharge, via a suitable circuit known to those skilled in the art, such as an integrator or a sampler actuated by the disabling of the flip-flop 8.

Figure 2:
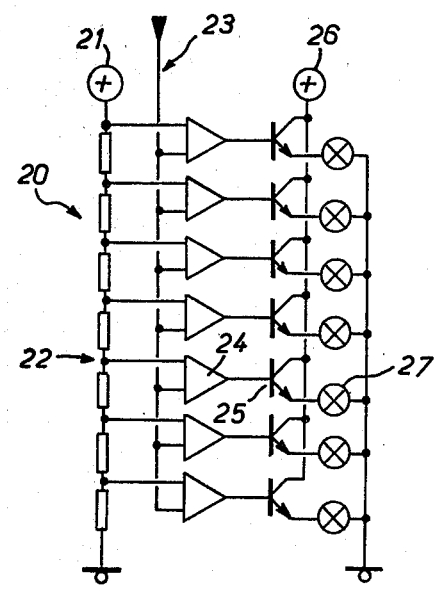
FIG. 2 is a circuit diagram of a potentiometric device for recording the delivery rate.

The potentiometric device, downstream of the circuit mentioned above, can be arranged as shown in FIG. 2. A potentiometric chain 20, connected between a reference potential source 21 and earth, defines a series of reference potential steps each corresponding to the potential associated with a given delivery rate. The reference potential of each step (such as 22) is applied to an input of a comparator 24 which receives, on its other input, the potential to be measured, applied to the conductor 23 which is shared between all the step comparators. The output of the comparator 24 is fed to the base of a transistor which is connected via its collector to a positive voltage source 26, whilst its emitter feeds to an electroluminescent diode 27. When the reference potential of the step 22 is greater than the potential 23, the transistor 25 is blocked and the diode 27 is extinguished. When the potential 23 exceeds the reference potential of step 22, the comparator 24 saturates the transistor 25 and the diode 27 lights up.

It will be understood that if it is desired to trigger an alarm when the delivery rate exceeds a predetermined value, the control of the alarm device is connected in parallel to the luminescent diode of the step corresponding to the predetermined delivery rate. The same type of control device, operating on the basis of insufficient potential, can be used to signal a delivery rate lower than a predetermined threshold.

Of course, the invention is not limited to the examples described but encompasses all the different embodiments. In particular, for specific cases, a detectable disturbance of the state of the fluid other than a temperature rise may be chosen, such as, for example, an ionisation, a variation in chemical activity, or a variation in electrical or thermal conductivity.

We claim:

1. Flowmeter for a fluid, comprising a length of pipeline through which the fluid flows, emitting means constituted by an electrical resistance in the form of a grid extending in a transverse plane of the length of pipeline for producing, in response to an input pulse, a disturbance to the state of the fluid positioned in the pipeline at a first point in its length, a detector constituted by an electrical resistance having a temperature coefficient and supplied with a constant current, said detector being sensitive to the disturbance in the state of the fluid for emitting an output signal, the detector being positioned in the pipeline at a second point in its length spaced downstream of said first point in the direction of flow by a predetermined distance, a pulse generator for periodically applying an input pulse to said emitting means, and means connected to said pulse generator and to said detector for measuring the time between an input pulse and the corresponding output signal, said means for measuring the time comprising an amplifier having an input connected to the terminals of the resistance having a temperature coefficient by way of a first capacitor, a flip-flop with an enabling input connected to the pulse generator and a disabling input connected to the output of the amplifier, and a second capacitor which is charged in response to the pulses from the generator and is discharged across a resistance by the enabled flip-flop.

2. Flowmeter according to claim 1, further comprising a potentiometric means, having a substantially infinite input resistance connected to the terminals of said second capacitor.

3. Flowmeter according to claim 2, wherein said potentiometric means comprises a potentiometric chain with a series of reference voltage steps and a respective comparator means associated with each step, each said comparator means receiving the charge potential of the second capacitor and the reference potential of the respective step, and a respective electroluminescent diode controlled by an associated comparator means.

* * * * *